Patented Mar. 23, 1954

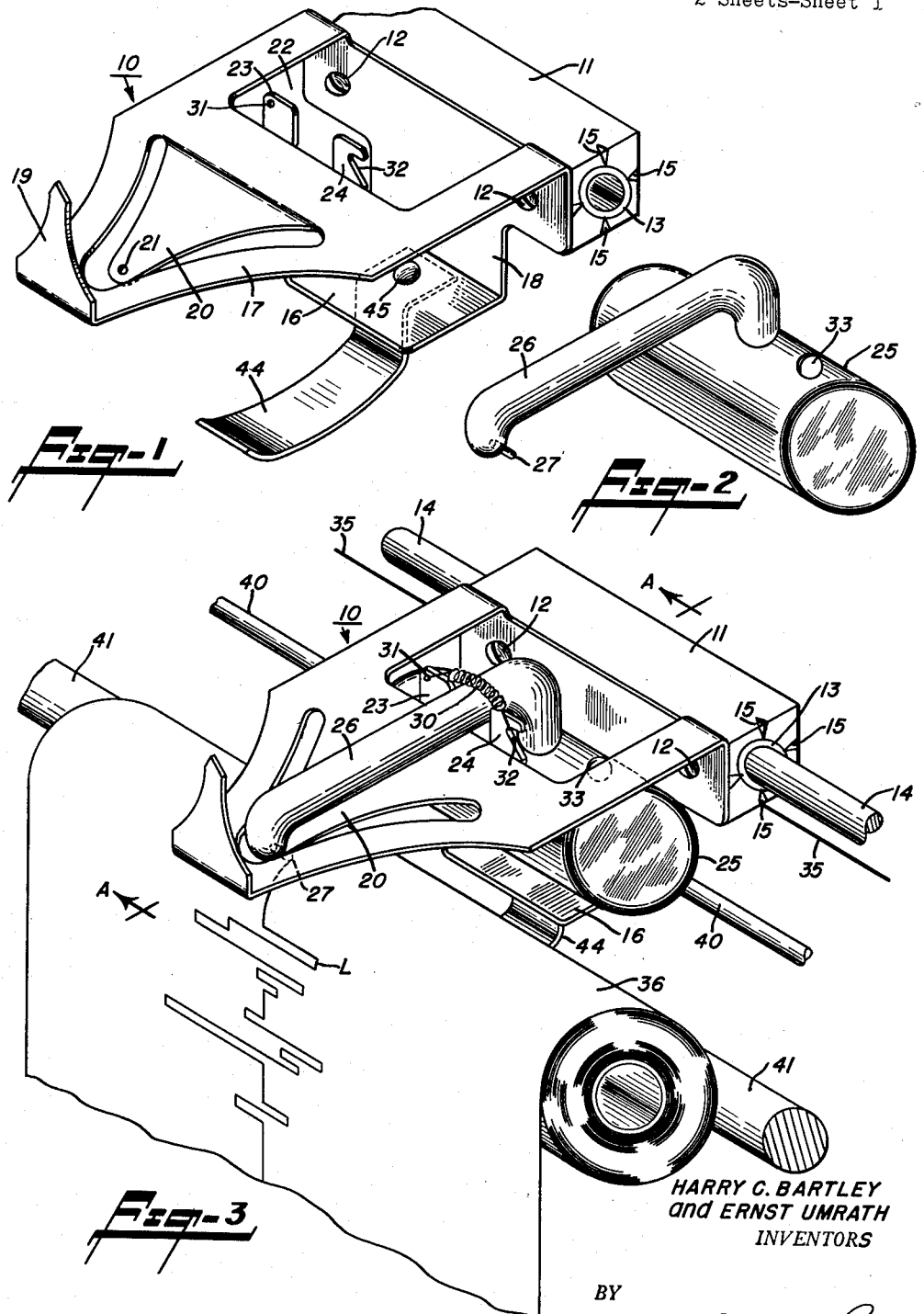

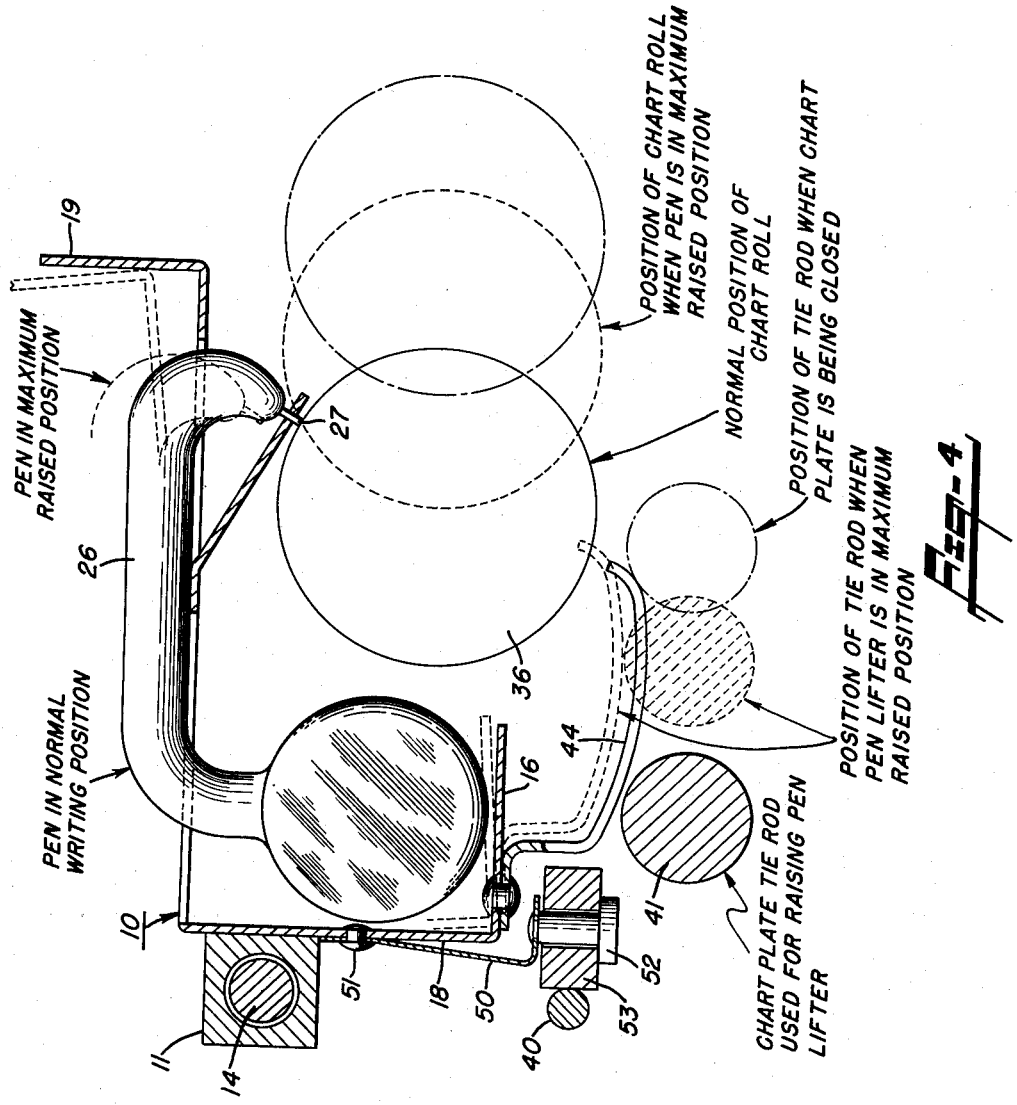

2,673,138

UNITED STATES PATENT OFFICE 2,673,138

MARKER FOR RECORDING APPARATUS

Harry C. Bartley, West Orange, and Ernst Umrath, Bloomingdale, N. J., assignors to Weston Electrical Instrument Corporation, Newark, N. J., a corporation of New Jersey Application May 20, 1952, Serial No. 288,898

7 Claims. (Cl. 346—140)

This invention relates to improvements in automatic indicating and recording apparatus and more particularly to a novel construction of the recording pen and associated mechanism.

Recorders of the type to which this invention relates are useful in providing a measurement and record of variable conditions, such as temperatures. The indication and recording of the instantaneous state of the variable condition is usually accomplished by electrical networks which are adapted to be unbalanced by a variation in the condition and to effect an operation of a suitable rebalancing means. Such rebalancing operations include the actuation of suitable power means for simultaneously moving an inking pen over a constantly-movable, calibrated chart. In present recorders the pen carriage and associated components are of complicated and costly construction.

An object of this invention is the provision of a novel pen carriage for use on a recorder which carriage affords significant advantages from the standpoint of operation, manufacturing and assembly costs and which permits refilling of the ink reservoir in situ.

An object of this invention is the provision of a pen carriage mechanism including simple means for limiting the contact pressure between the pen stylus and a chart to a predetermined maximum value thereby preventing clogging of the stylus and/or damage to the chart.

An object of this invention is the provision of a pen carriage mechanism for recorders and including means for lifting the pen stylus from the recorder chart as the latter is moved into or out of proper operating position with respect to the stylus.

An object of this invention is the provision of a pen carriage mechanism for a recorder said mechanism comprising a frame including a pointer, a pen supported by the frame and including a stylus adapted to contact the recorder chart, means forming part of the frame for properly alining the stylus with the pointer, means limiting the contact pressure of the stylus on the chart and automatic means for moving the stylus away from the chart as the latter is moved into or out of operating position with respect to the stylus.

An object of this invention is the provision of pen carriage assembly comprising a frame formed of a single sheet of metal and including stylus positioning means, an ink reservoir carried by the frame and carrying a stylus positionable by said positioning means, a bearing member secured to the frame and movable along a fixed bar, a roller mechanically coupled to the frame by spring means and adapted for rolling contact with a second fixed bar, said spring means and roller counter-balancing the weight of the carriage to limit the contact pressure between the stylus and the recorder chart, and a relatively-yieldable member carried by the frame and cooperating with a member movable with the chart to lift the stylus out of contact with the chart when the latter is moved into or out of operating position with respect to the stylus.

These and other objects and advantages will become apparent from the following description when taken with the accompanying drawings. It is to be understood the drawings are for purposes of illustration and are not to be construed as defining the scope or limits of the invention, reference being had for the latter purpose to the appended claims.

In the drawings wherein like reference characters denote like parts in the several views:

Figure 1 is an isometric view of the pen carriage mechanism made in accordance with our invention;

Figure 2 is an isometric view of the pen;

Figure 3 is an isometric view showing the pen carriage, carrying the pen, in proper operative position with respect to the recorder chart and including other cooperating members necessary to a proper understanding of the invention; and Figure 4 is, essentially, a transverse, sectional view taken along the line A—A of Figure 3 and showing the pen carriage counter-balancing mechanism as well as the automatic means for lifting of the stylus from the chart as the latter is moved from or to its proper operating position with respect to the stylus.

Reference is now made to Figure 1 which shows the pen carriage mechanism. Such mechanism comprises a metal frame member 10, that is punched and formed from sheet stock and secured to the rectangular bearing member 11 by by the screws 12. It may here be pointed out that the bearing member has an axial hole extending therethrough and each end of the member 11 carries a suitable bearing, such as the bearing 13 visible in the drawing, whereby the entire pen carriage mechanism may slide along a round bar 14, see Figure 3. The bearings 13 may be secured in fixed position relative to the member 11 by means of suitable detents 15. The frame member 10 is of general U-shape and includes the parallel arms 16 and 17 extending from the base section 18, the forward end of the upper arm 17 being bent upwardly and pointed to form a pointer 19. Further, the upper arm 17 has a downwardly-bent tongue 20 provided with a hole 21 therein to receive the stylus of the pen, as will become apparent hereinbelow. The rectangular opening 22 permits the ink reservoir to be inserted and removed from the frame with a minimum of effort and also permits refilling such ink reservoir without removal thereof from the pen carriage mechanism. The integral upwardly-extending projections 23, 24 receive the neck of the pen, as will now be described.

Figure 2 is an isometric view of the pen which comprises a reservoir section 25 communicating with the neck 26 that carries the stylus 27. It will be clear from a study of Figures 1–3 that the reservoir section of the pen is insertable through the rectangular opening in the upper arm of the frame to rest upon the lower frame arm 16, that the neck of the pen is disposed between the upstanding frame projections 23 and 24, and that the stylus of the pen extends through the hole in the frame tongue 20. Since the hole in the frame tongue is on the same center line as the pointer 19 the stylus is always properly alined with the pointer. The pen may be secured to the frame member by a coiled spring 30 passing over the neck 26, said spring having one end anchored in the hole 31 in the projection 23 and the other end looped over the notch 32 in the cooperating projection 24. Refilling of the ink reservoir is accomplished quickly and easily by inserting an eye dropper through the upper frame opening and into the hole 33 in the top surface of the reservoir section 25, there being no need to remove or disassemble any parts for the purpose.

As shown in Figure 3, the pen carriage mechanism is slidable along the fixed bar 14 by movement of the driving wire 35 in one direction or the other, said wire being fastened to the rectangular bearing member 11 by any suitable means. Those skilled in this art will understand that the movement of the pen carriage mechanism is effected by suitable power means during the rebalancing of the electrical network that is sensitive to the variations in the condition being measured and recorded and that the pen stylus 27 will draw a corresponding line L on a calibrated paper chart 36, the latter being unrolled at a constant rate by suitable motor-driven means. It is desirable to limit the contact pressure between the stylus and the chart in order to prevent clogging of the stylus by paper shreds and to prevent the stylus from scratching through the chart paper upon repeated movements of the stylus over the same portion of the chart. We accomplish this purpose by means of a simple spring means that counterbalances the major portion of the pen carriage weight. Such means comprises a roller that is carried by a resilient spring secured to the base portion 18 of the U-shaped frame member. Such spring and roller are not visible in the isometric views of Figures 1–3 and will be described in detail, hereinbelow, with specific reference to Figure 4. Suffice to say, for the present, that the roller establishes a rolling contact with a fixed track-bar 40 as the pen carriage mechanism moves along the bar 14, said track bar being parallel to the bar 14. Also, in recorders of the type wherein the chart is carried by a vertically-pivoted chart plate whereby the chart may be swung outwardly away from the pen, it is desirable that the pen stylus be moved out of contact with the chart during such chart motion in order to prevent damage to the stylus and the drawing of a spurious record. We accomplish this by a simple pen-lifter arrangement comprising a tie rod that is carried by the chart plate and an arcuate, resilient cam-spring secured to the pen carriage mechanism. As shown in Figure 1, such arcuate cam-spring 44 is secured to the lower frame arm 16 by the rivet 45.

Reference is now made to Figure 4 for a detailed description of the pen carriage counterbalancing mechanism and the operation of the pen lifter arrangement, Figure 4 being a transverse sectional view taken along the line A—A of Figure 3 and including thereon three positions of the chart roll and associated tie rod with respect to the pen carriage, all for the purpose of conveying a clear understanding of the features of our invention. It will be apparent that the pen carriage assembly normally will tend to rotate by gravity action about the rod 14 (that passes through the rectangular bearing member 11) to bring the pen stylus 27 into contact with the paper chart roll 36. As stated above, it is highly desirable to limit the contact pressure between the stylus and the chart to a value much less than that resulting from the weight of the entire pen carriage mechanism. For this purpose we secure a resilient, leaf spring 50 to the base portion 18 of the U-shaped frame 10 by the rivet 51. Such leaf spring extends below the level of the lower frame arm 16 and the offset, free end of the spring is rigidly secured to a headed stud 52, the latter being provided with a shoulder for this purpose, as shown. The stud 52 passes through a clearance hole in the roller 53 whereby the roller is free to rotate about the stud as the roller moves axially along the fixed track-bar 40. When the pen carriage mechanism is in its normal position, as shown by the solid lines, the leaf spring exerts a counterclockwise force which counterbalances the weight of the entire mechanism that is rotatable about the bar 14. In actual practice we adjust the force exerted by the leaf spring, as by bending, so that the spring force counterbalances the weight of the pen carriage mechanism with the pen removed. Consequently, the effective contact pressure between the pen stylus and the chart is that developed by the weight of the pen and its contained ink about the pivot axis formed by the rod 14. Such relatively-small contact pressure is sufficient to provide proper ink flow from the stylus to the chart yet not sufficient to cause a scuffing of the chart paper with its attendant disadvantages. If now, we assume that the chart roll 36 is moved to the right (away from the pen carriage in the drawing) the weight of the pen carriage will tend to cause it to rotate in a clockwise direction. However, such rotational movement of the pen carriage is restricted to a relatively small angle by reason of the compliance of the leaf spring 50. Thus, when the chart roll 36 is moved away from the pen carriage, as is the case when one end of the chart plate is vertically-pivoted for rotation in a horizontal plane, the pen stylus 27 drops down only a relatively small distance. Since the cam-spring 44 is secured to the pen carriage the described motion-limiting action of the leaf spring 50 assures a proper positioning of the cam-spring, with respect to the associated tie rod 41, for lifting the pen stylus as the chart roll is moved into and out of operating position, as will now be described in detail.

The cam-spring 44 cooperates with the tie rod 41 that is secured in fixed position on the conventional chart plate. Thus, the chart roll 36 and the tie rod 41 are movable as a unit in a horizontal plane and to the right of the pen carriage. The solid lines show the position of the tie rod with respect to the cam-spring 44, and the position of the chart plate 36 with respect to the stylus 27, when the chart roll is in the operating position with respect to the pen stylus. As the tie rod 41 is moved to the right it comes into sliding contact with the lower surface of the cam-spring and although the cam-spring has a certain degree of resiliency it is relatively stiff and, therefore, imparts a counter-clockwise rotation to the entire pen carriage thereby lifting the stylus 27 out of contact with the chart roll; the dotted lines showing the positions of the tie rod, cam-spring, chart roll, pen carriage and stylus, when the stylus is in the maximum raised position. As the chart roll and tie rod are moved further to the right, as shown by the broken line representations, the entire pen carriage assembly drops downwardly to a position determined by the compliance of the leaf spring 50, as has been explained hereinabove. When the chart plate, carrying the chart roll and tie rod, is rotated in a reverse direction (as is the case when the chart is returned to proper operating position relative to the pen stylus) a similar pen-lifting action takes place. It is apparent, therefore, that the tie rod 41 cooperates with the cam-spring, to raise and lower the pen stylus during the critical positions of the chart roll as the latter is moved from and to proper operating position with respect to the stylus, thereby eliminating the possibility of damage to the stylus and/or chart.

Having now described our invention certain variations and modifications in the cooperating components and their related assembly will occur to those skilled in this art. Such variations and modifications may be made without departing from the spirit and scope of the invention as set forth in the following claims.

We claim:

1. In a recorder of the type including an inking stylus, a chart roll manually movable into operative position with respect to a stylus and power means for unrolling the chart whereby the stylus will draw a record on the chart surface during such periods when the chart roll is in the operative position, the combination of a frame including a pointer and positioning means effective to aline a stylus with the pointer; a bearing member secured to the frame and slidable along a fixed bar disposed substantially parallel to the axis of the chart roll; a pen carried by the frame and including a stylus alined with the said pointer by the said positioning means and a neck section; means counterbalancing the weight of the frame to limit maximum contact pressure between the stylus and the chart surface to a predetermined value; and lifting means effective upon movement of the chart roll out of the operating position to rotate the said frame about the fixed bar.

2. The invention as recited in claim 1, wherein the said frame is formed of a single sheet of metal.

3. The invention as recited in claim 2, wherein the frame is U-shaped including a base portion secured to the bearing member; a lower arm extending from the base portion and supporting the pen; an upper arm extending from the base portion, said upper arm terminating in the said pointer; and an offset tongue in the upper arm, said tongue having a hole alined with the pointer and which constitutes the positioning means; and spaced, upstanding members extending from the upper arm, said members disposed on opposite sides of the neck section of the pen.

4. The invention as recited in claim 1, wherein the means counterbalancing the weight of the frame comprises a leaf spring having an end secured to the said frame, a roller rotatably carried by the other end of the leaf spring, said roller being in surface contact with a fixed track disposed parallel to the fixed bar along which the said bearing member is slidable.

5. The invention as recited in claim 1, wherein the lifting means comprises an arcuate resilient member secured to the frame, said arcuate member having a surface lying in the path of travel of a rod that is movable with the chart roll as the latter is moved into and out of operative position with respect to the stylus.

6. In a recorder of the type including an inking stylus, a chart roll manually movable into operative position with respect to the stylus and power means for unrolling the chart whereby the stylus will draw a record on the chart surface during such periods when the chart roll is in the operative position, the combination of a U-shaped frame including a base, a lower arm extending from the base and an upper arm extending from the base in spaced parallel relation to the lower arm, said upper arm including a rectangular opening; an upwardly offset end on said upper arm, said end being tapered to form a pointer; a downwardly-offset tongue in said upper arm, said tongue having a hole alined with the pointer; a fixed bar disposed substantially parallel to the axis of the chart roll; a bearing member secured to the base of the frame and slidable along said fixed bar; a pen comprising a reservoir resting on the lower frame arm, a neck extending along the upper frame arm and a stylus passing through the hole in the tongue; a fixed track spaced from and parallel to the said fixed bar; a spring member having an end secured to the frame; a roller rotatably secured to the other end of the spring member and in peripheral contact with the fixed track; a tie rod movable with the chart roll; and a resilient member secured to the frame and having a curved portion lying in the path of travel of the said tie rod.

7. The invention as recited in claim 6 wherein the upper frame arm includes upwardly-extending projections, said projections being spaced apart to accommodate the neck of the pen.

HARRY C. BARTLEY.
ERNST UMRATH.

References Cited in the file of this patent

UNITED STATES PATENTS

| Number | Name | Date |
|---|---|---|
| 992,010 | Lamphier | May 9, 1911 |
| 2,199,078 | Lindemann | Apr. 30, 1940 |
| 2,330,082 | Side et al. | Sept. 21, 1943 |